United States Patent [19]

Okada et al.

[11] Patent Number: 4,819,109

[45] Date of Patent: Apr. 4, 1989

[54] SLIDABLE CARRIAGE MOUNT FOR DISC MEMORY APPARATUS

[75] Inventors: Sadao Okada; Tetsu Yamamoto; Takashi Yumura, all of Amagasaki, Japan

[73] Assignee: Mitsubishi Denki Kabushiki Kaisha, Tokyo, Japan

[21] Appl. No.: 872,373

[22] Filed: Jun. 9, 1986

[30] Foreign Application Priority Data

Jul. 27, 1985 [JP] Japan .................................. 60-166521

[51] Int. Cl.$^4$ ......................... G11B 5/55; G11B 21/08
[52] U.S. Cl. ..................................... 360/106; 360/104
[58] Field of Search .................. 360/104, 106; 310/12, 310/13, 27; 267/141, 153

[56] References Cited

U.S. PATENT DOCUMENTS

| | | | |
|---|---|---|---|
| 3,922,720 | 11/1975 | Caletti et al. | 360/106 |
| 4,044,977 | 8/1977 | Feucht | 267/153 X |
| 4,220,899 | 9/1980 | Von der Heide | 360/106 X |
| 4,730,226 | 3/1988 | Shatkin | 360/106 |
| 4,752,849 | 6/1988 | Yoshida et al. | 360/106 |

Primary Examiner—John H. Wolff
Attorney, Agent, or Firm—Sughrue, Mion, Zinn, Macpeak and Seas

[57] ABSTRACT

A transducer carriage 1 is slidably mounted on and between parallel guide rails 2a, 2b by two spaced pairs of inclined bearing rollers 3a, 4a, 3b, 4b, on one side and a single intermediate pair of such rollers 3c, 4c on the other side. The lower intermediate roller 4c is elastically mounted to the carriage by a rubber shaft ring 9 and exerts a biasing force on its guide rail, to thereby maintain the remaining fixedly mounted rollers in stable contact with their associated rails.

7 Claims, 3 Drawing Sheets

FIG. 1 PRIOR ART
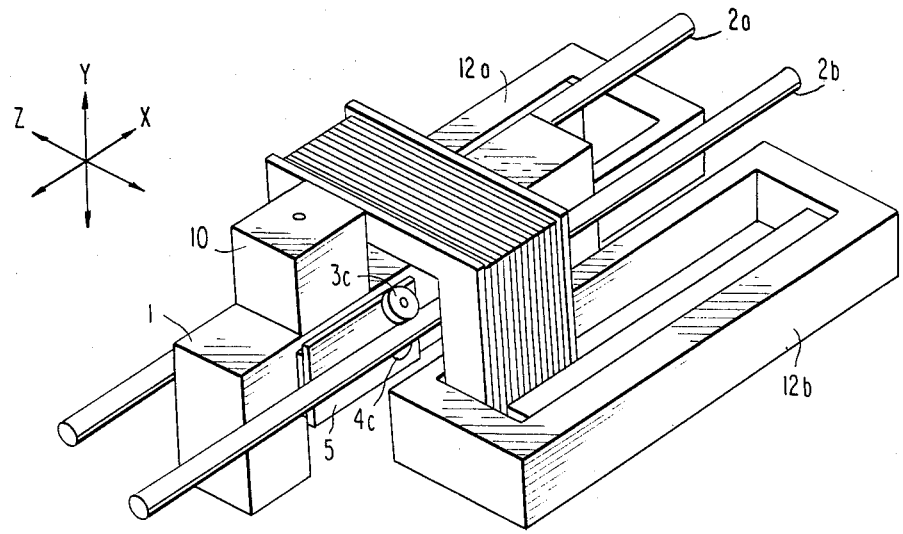
FIG. 2 PRIOR ART
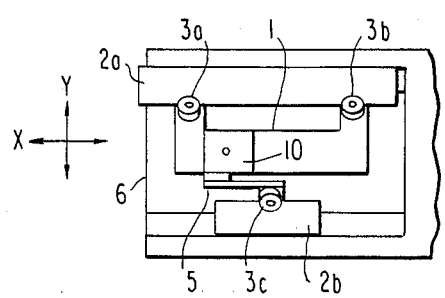
FIG. 3 PRIOR ART
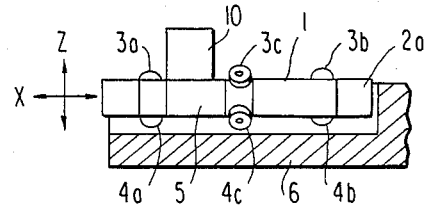
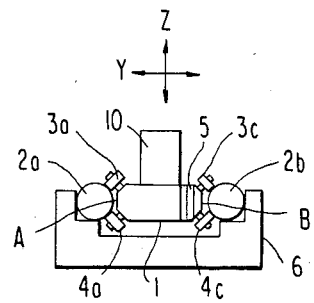
FIG. 4 PRIOR ART

SLIDABLE CARRIAGE MOUNT FOR DISC MEMORY APPARATUS

BACKGROUND OF THE INVENTION

This invention relates to an improved slidable carriage mount for a linearly reciprocable data transducer in a disc memory storage apparatus.

FIGS. 1 through 4 show a conventional carriage device for a disc memory storage apparatus as described in Japanese patent application No. 55-116673, wherein an optical read/write data transducer 10 for a memory disk (not shown) is mounted to a carriage 1 slidable on a pair of parallel guide rods or rails 2a and 2b disposed at opposite sides A and B of the carriage. Two identical pairs of symmetrically arranged and longitudinally spaced bearing rollers or wheels 3a, 4a and 3b, 4b are mounted on side A of the carriage and ride on the guide rail 2a. A single pair of similar bearing rollers 3c and 4c is mounted on a metal spring plate 5 secured to the other side B of the carriage, and ride on the guide rail 2b. The guide rails are fixed on a base 6. A linear motor coil 11 (shown only in FIG. 1) is fixed to the carriage 1, and cooperates with magnetic core structures 12a and 12b disposed on opposite sides thereof.

When a target position on a disk has been determined, electric current is fed to the coil 11 in response to instructions from a control unit, and the carriage is driven in the X direction to access the target position.

Due to the inclinations of the respective upper and lower bearing rollers 3a, 3b, 3c and 4a, 4b, 4c and the force exerted by the spring plate 5, all of the rollers are urged against their associated guide rails 2a, 2b to slidably and stably support the carriage.

Any rotational movement of the carriage around the Y and Z axes is restrained by this construction when the driving force acts at the approximate center of gravity of the carriage, and a stable linear reciprocal movement of the carriage along the guide rails is thus attained.

In such a conventional construction, however, the large mass of the carriage tends to twist the metal spring plate 5 when the carriage is quickly moved in the X direction, and the resulting rotational movements of the carriage around the X axis produce harmful vibrations in the carriage which adversely affects its positioning accuracy. The protrusion of the spring plate from the side of the carriage also increases the size of the overall construction.

SUMMARY OF THE INVENTION

The present invention solves the above described problems, and provides a carriage mount with improved positioning accuracy by preventing any rotational movements of the carriage around the X, Y and Z axes and the attendant harmful vibrations.

In accordance with the invention all of the bearing rollers are mounted directly on the carriage, with a lower roller of the intermediate pair (on the single pair side of the carriage) not carrying any of the carriage weight and instead being elastically mounted such that it exerts a force on the engaged guide rail to urge the carriage downwardly and laterally away from the guide rail. Such elastic urging in turn provides the necessary reactive biasing force, together with the weight of the carriage, to maintain the remaining bearing rollers in stable and continuous contact with their associated guide rails.

BRIEF DESCRIPTION OF THE DRAWINGS

FIG. 1 is a perspective view of a conventional carriage device;

FIG. 2 is a top plan view of the conventional carriage device;

FIG. 3 is a cross-sectional view of FIG. 1;

FIG. 4 is an end view of FIG. 1;

DETAILED DESCRIPTION OF THE PREFERRED EMBODIMENTS

Figure 5:
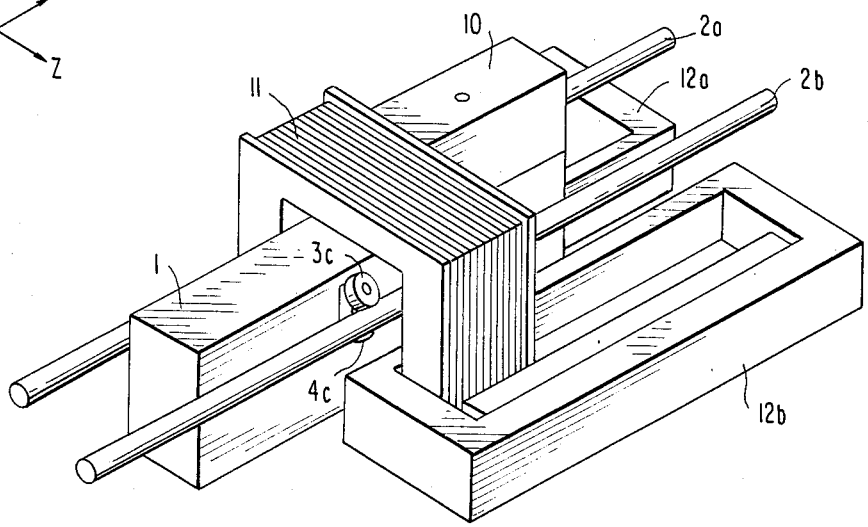
FIG. 5 is a perspective view of one embodiment of a carriage device of the present invention.
Figure 6:
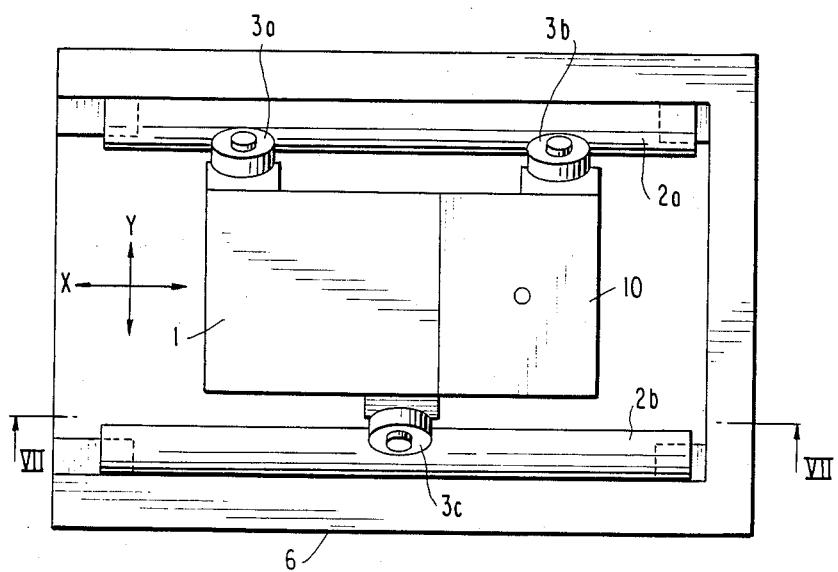
FIG. 6 is a top plan view of one embodiment of the carriage device of the invention.
Figure 7:
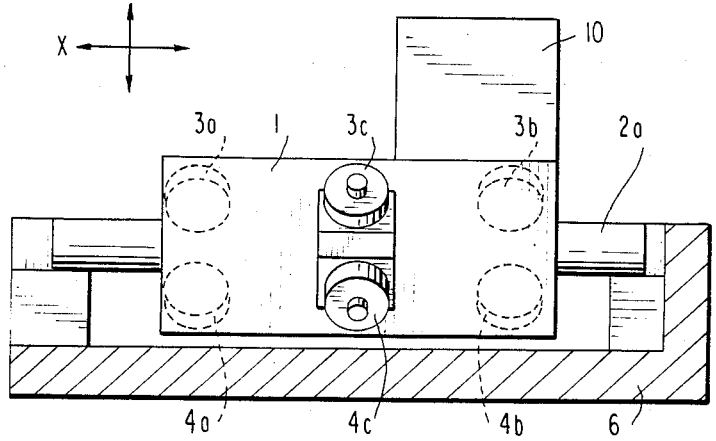
FIG. 7 is a cross-sectional view taken on line VII-VII of FIG. 6.
Figure 8:
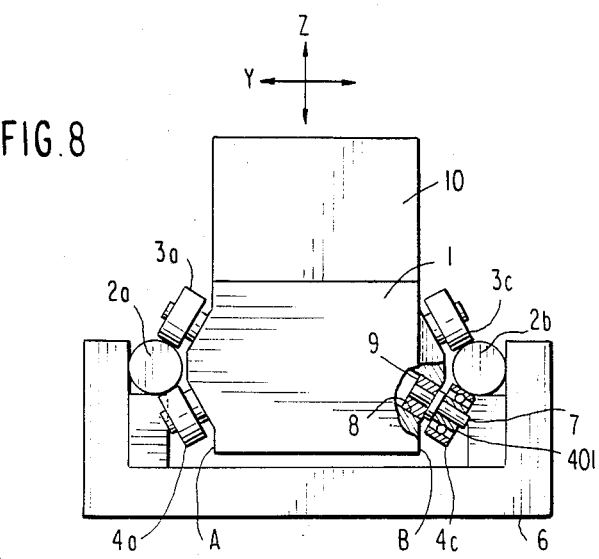
FIG. 8 is an end view of FIG. 7, with a sectional cutaway.
Figure 9:
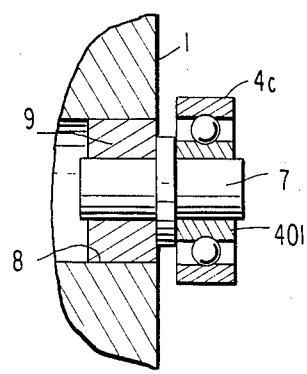
FIG. 9 is an enlarged cross-sectional view of a portion of FIG. 8.

FIGS. 5 through 9 show a preferred embodiment of a carriage mount according to the present invention, wherein like reference numerals identify the same structural elements as shown and described in FIGS. 1–4. As will now be seen, however, the single pair of bearing rollers 3c and 4c on the B side of the carriage, disposed intermediate the two roller pairs on the A side, are mounted directly to the carriage and the spring plate 5 has been eliminated. Instead the outer end of a shaft 7 is fixed to the inner ring or race 401 of bearing 4c which is disposed at the lower side on the guide rail 2b, free from the weight of the carriage 1. The inner end of the shaft 7 is fixed to an elastic member 9, such as a gum rubber ring. The elastic member 9 is fixedly inserted into an aperture 8 in the carriage, as seen in FIGS. 8 and 9.

The dimensions and parameters of the elastic member 9 are selected such that the roller 4c exerts a positive and predetermined force on the guide rail 2b, and the reactions to this force, together with the weight of the carriage, maintain the remaining rollers in stable and continuous engagement with their associated guide rails. Thus, the fixed or rigidly mounted bearing rollers 3a, 3b, 3c, 4a and 4b accurately establish the sliding position of the carriage on the guide rails, and the elastically or resiliently mounted intermediate lower bearing roller 4c alone serves to stably maintain such established position. Vibrationally induced rotations or chatterings of the carriage about the X axis are thereby avoided, to attendantly improve the positioning accuracy of the transducer even when the carriage is subjected to rapid acceleration and deceleration. The direct mounting of all of the rollers to the carriage also results in a more dimensionally compact construction.

Figure 10:
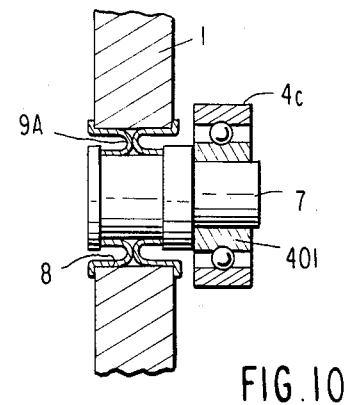
FIG. 10 is an enlarged cross-sectional view corresponding to FIG. 8, showing another embodiment of the invention.

Although the elastic mounting member 9 has been described as a gum rubber ring, it may alternatively comprise a metal spring member 9A as shown in FIG. 10.

Figure 11:
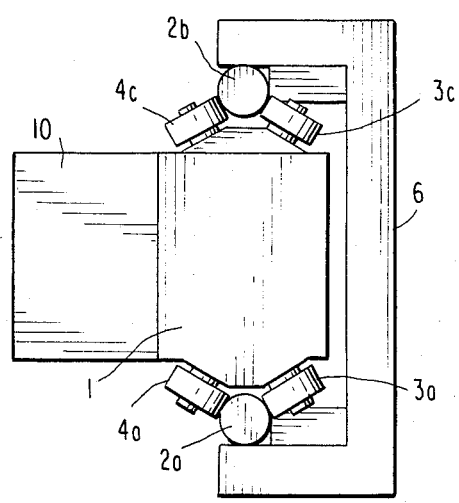
FIG. 11 is an end view of a further, vertically oriented embodiment of the invention.

FIG. 11 shows a vertically oriented embodiment of the invention, wherein the elastically mounted bearing roller 4c is attached to an upper side of the carriage and is similarly free from the weight thereof.

What is claimed is:

1. A slidable transducer carriage mounting arrangement for a disk memory apparatus, comprising:
   (a) a pair of spaced parallel guide rails (2a, 2b),
   (b) an elongate transducer carriage (1) disposed between the rails and having two opposite sides extending in the direction of said rails and two opposite ends connecting said sides,
   (c) two pairs of mutually and differently inclined bearing rollers (3a, 4a; 3b, 4b) having shafts fixedly mounted to one side of the carriage proximate said opposite ends thereof, the rollers of each pair riding on one of the rails (2a) along angularly displaced lines of contact, and
   (d) a further pair of mutually and differently inclined bearing rollers (3c, 4c), a first roller (3c) of said further pair having a shaft fixedly mounted to another, opposite side of the carriage intermediate said ends thereof and riding on another of the rails (2b) along a first line of contact, and a second roller (4c) of said further pair having a shaft (7) resiliently mounted to said opposite side of the carriage intermediate said ends thereof, and below and opposite said first roller, by an elastic member (9) concentrically surrounding an inner end of said second roller shaft and disposed in an aperture (8) in said another, opposite side of the carriage, said second roller riding on said another rail along a second line of contact angularly displaced from said first line, said second roller being disposed such that it does not bear any of the carriage weight and being urged against said another rail by the elastic member to thereby maintain all of the rollers in stable and continuous positional engagement with their associated rails when the carriage is subjected to rapid accelerations and decelerations.

2. A mounting arrangement according to claim 1, wherein axes of the guide rails lie in a common horizontal plane, and the first line of contact lies above said plane such that the first roller of said further pair supports approximately one-half of the weight of the carriage.

3. A mounting arrangement according to claim 2, wherein the elastic member comprises a rubber mounting ring.

4. A mounting arrangement according to claim 2, wherein the elastic member comprises an annular spring (9A) having a U-shaped cross-section.

5. A mounting arrangement according to claim 2, wherein the shafts of upper rollers (3a, 3b, 3c) of said two pairs and said further pair extend upwardly and outwardly from the carriage, and the shafts of lower rollers (4a, 4b, 4c) of said two pairs and said further pair extend downwardly and outwardly from the carriage.

6. A mounting arrangement according to claim 1, wherein axes of the guide rails lie in a common vertical plane, and all of the weight of the carriage is supported by said two pairs of rollers.

7. A mounting arrangement according to claim 1, wherein axes of the guide rails lie in a common horizontal plane, the shafts of upper rollers (3a, 3b, 3c) of said two pairs and said further pair extend upwardly and outwardly from the carriage, and the shafts of lower rollers (4a, 4b, 4c) of said two pairs and said further pair extend downwardly and outwardly from the carriage.

* * * * *